United States Patent
Bae

(10) Patent No.: US 6,674,761 B1
(45) Date of Patent: Jan. 6, 2004

(54) METHOD FOR CONTROLLING MULTI-CHANNEL VOICE DATA OF GATEWAY SYSTEM AND APPARATUS THEREOF

(75) Inventor: Sung Han Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/414,718

(22) Filed: Oct. 12, 1999

(30) Foreign Application Priority Data

Oct. 13, 1998 (KR) .............................. 98-42765

(51) Int. Cl.[7] .................. H04L 12/56; H04L 12/66; H04J 3/22
(52) U.S. Cl. .................. 370/412; 370/352; 370/401; 370/466
(58) Field of Search .................. 370/352, 353, 370/356, 401, 412, 413, 464, 474, 475, 476, 466, 467; 709/230, 231; 379/88.17, 93.01

(56) References Cited

U.S. PATENT DOCUMENTS

| | | | |
|---|---|---|---|
| 5,838,994 A | * 11/1998 | Valizadeh | 710/56 |
| 6,009,471 A | * 12/1999 | Harumoto et al. | 709/231 |
| 6,269,095 B1 | * 7/2001 | Neubauer et al. | 370/352 |
| 6,295,292 B1 | * 9/2001 | Voit et al. | 370/352 |
| 6,304,567 B1 | * 10/2001 | Rosenberg | 370/356 |
| 6,366,959 B1 | * 4/2002 | Sidhu et al. | 709/231 |
| 6,434,606 B1 | * 8/2002 | Borella et al. | 709/214 |
| 6,434,620 B1 | * 8/2002 | Boucher et al. | 709/230 |
| 6,445,697 B1 | * 9/2002 | Fenton | 370/357 |
| 6,487,196 B1 | * 11/2002 | Verthein et al. | 370/352 |

* cited by examiner

*Primary Examiner*—Hassan Kizou
*Assistant Examiner*—Timothy Lee
(74) *Attorney, Agent, or Firm*—Fleshner & Kim, LLP

(57) ABSTRACT

A method and its apparatus for controlling multi-channel voice data in a gateway system between voice network such as a public switched telephone network (PSTN) and an internet network, in which a plurality of memory regions of channel buffer are statically allocated, to each of which an RTP header is allocated, and a voice packet received from the PSTN network and a voice packet received from an IP network are transferred, by which, a processing speed is remarkably reduced, and more channels can be accommodated.

17 Claims, 4 Drawing Sheets

METHOD FOR CONTROLLING MULTI-CHANNEL VOICE DATA OF GATEWAY SYSTEM AND APPARATUS THEREOF

BACKGROUND OF THE INVENTION

1. Field of the Invention

The present invention relates to a gateway system, and more particularly to a technique for controlling multi-channel voice data of a gateway system between a public switched telephone network (PSTN) and an internet network.

2. Description of the Conventional Art

Recently, as a voice communication terminal based on an internet protocol IP such as internet phone has been activated, development of a gateway system enabling a voice communication between the IP network and the PSTN is under way. In general, such gateway system includes a call control conversion part and a voice data conversion part, of which the voice data conversion part is a critical element for a high performance and efficiency in view that it should be processed at a high speed for real time.

That is, since interfacing is performed between each protocol hierarchy, when the data is given and taken between each protocol hierarchy, a standardized protocol should be first processed, and the efficiency of the voice communication depends on how to control the voice data.

FIG. 1 is a schematic view of the standardized voice process protocol structure of a general gateway system in accordance with a conventional art.

An analog audio signal received through a PSTN interface 101 from the PSTN network is converted to a digital voice data by an audio CODEC 102. A multi-channel packet controller 103 packetizes a plurality of digital voice data. A real-time protocol/real-time transmission control protocol (RTPIRTCP) unit 104 adds an RTP header to the packetized digital voice data, and a user datagram protocol/internet protocol (UDP) unit 105 adds a UDP header thereto to output it. The packetized digital voice data to which the UDP header is added is transmitted to a LAN or to an internet network via a local area network (LAN) interface 106.

Meanwhile, a process for transmitting the packetized digital voice data from the LAN or the internet network to the PSTN is carried out in the reverse order to the above process.

FIG. 2 shows data formats to be processed at each units of FIG. 1, which refers to a voice data formats between each protocol interface in the general gateway system in accordance with the conventional art.

When the digital voice data converted in the audio CODEC 102 is counted to a predetermined number, the multi-channel packet controller 103 packetizes them by a single packet to generate a RTP data, an RTP/RTCP unit 104 adds an RTP header to the RTP data to generate a UDP data, and the UDP unit 105 adds a UDP header to the UDP data.

Reversely, when the packetized digital voice data (UDP data) is inputted from the LAN or the internet network, the UDP unit 105 removes the UDP header from the UDP data to generate a RTP data, and the RTP/RTCP unit 104 removes the RTP header from the RTP data to generate a voice packet. The multi-channel packet controller 103 generates analog audio signals corresponding to each voice data from the voice packet and transmits them to the PSTN network. In this respect, the RTP header carries a control information for controlling the RTP data.

The above process is performed for a single channel, which is to be performed for several channels at real time, in which a single PSTN channel is mapped with a single channel of the UDP unit.

In case of an interrupt event drive method, an overhead of an interrupt service switching time or a task switching time for each channel and each packet is very critical.

That is, assuming that a packetizing period is 30 ms and the number of the channel is N, when an audio signal is received from the PSTN, an interrupt service switching should occur N times at maximum within 30 ms of packetizing period and N times of task switching should occur. Namely, every time the interrupt signal is generated at each channel, the interrupt service switching and the task switching should occur.

In detail, when the interrupt service switching occurs once, for a single channel, the RTP header and the UDP header are added to the packet data provided from the multi-channel packet controller and then transmitted to the internet network or LAN, which is to be performed N times.

In addition, for the events in the reverse direction, that is, when the packetized digital voice data is inputted from the internet network, the similar process should be done.

In this respect, however, if the plurality of events are not processed within 30 ms of the pecketizing period, the system efficiency is much deteriorated due to the switching overhead. Accordingly, in order to manage the system stably, the number of the channels to be processed by the system is inevitably limited due to the switching overhead.

SUMMARY OF THE INVENTION

Accordingly, an object of the present invention is to provide a method for controlling multi-channel voice data of a gateway system and its apparatus which is capable of reducing the time to be taken for processing voice data between a PSTN and an internet protocol terminal.

To achieve these and other advantages and in accordance with the purpose of the present invention, as embodied and broadly described herein, there is provided a method for controlling multi-channel voice data of a gateway system and its apparatus in which an interrupt event is posted once during a packetizing period to perform a RTP/multi-packet controller driver applied program task, and a memory region of a buffer is divided by voice packet units and a RTP header is statically allocated to each memory region by which RTP data corresponding to N number of channels are processed as a whole when an interrupt signal is generated.

Also, there is provided a method for controlling multi-channel voice data of a gateway system including the steps of: allocating statically a plurality of memory regions of a channel buffer; storing a RTP header at each allocated memory region; copying sequentially a plurality of voice packets received from a multi-channel packet controller on each memory region to produce a plurality of UDP data; and sequentially transmitting the plurality of UDP data to a UDP unit when an interrupt signal is generated.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 3:
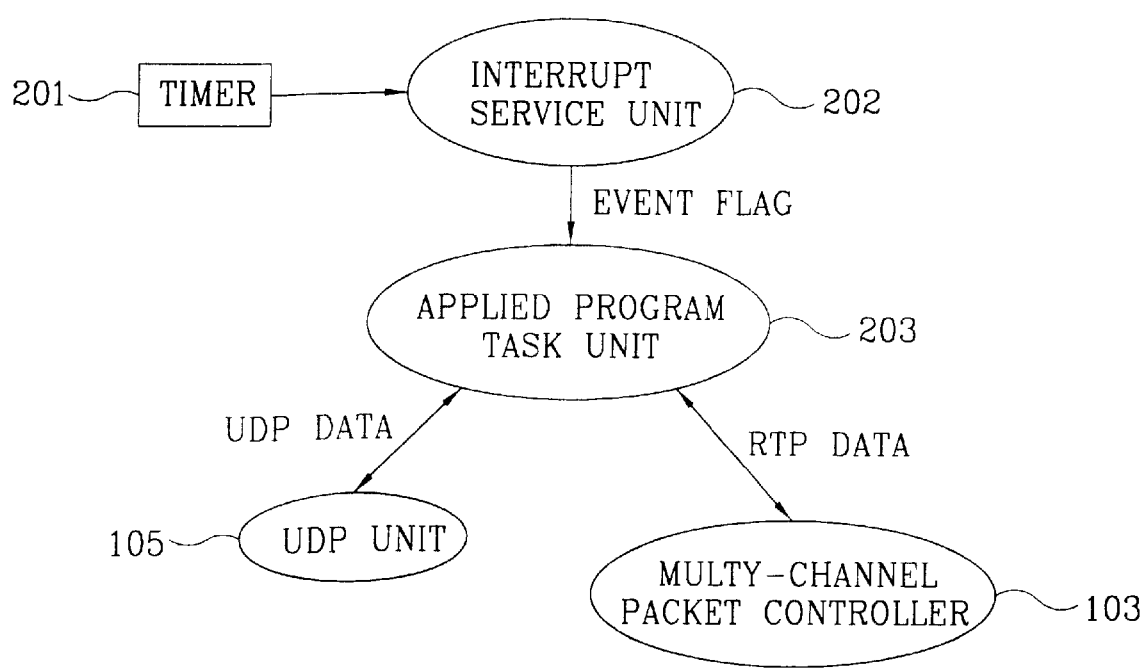
FIG. 3 shows a structure of task scheduling for controlling a multi-channel voice data of a gateway system in accordance with the present invention.

FIG. 3 shows a structure of task scheduling for controlling a multi-channel voice data of a gateway system in accordance with the present invention.

Figure 1:
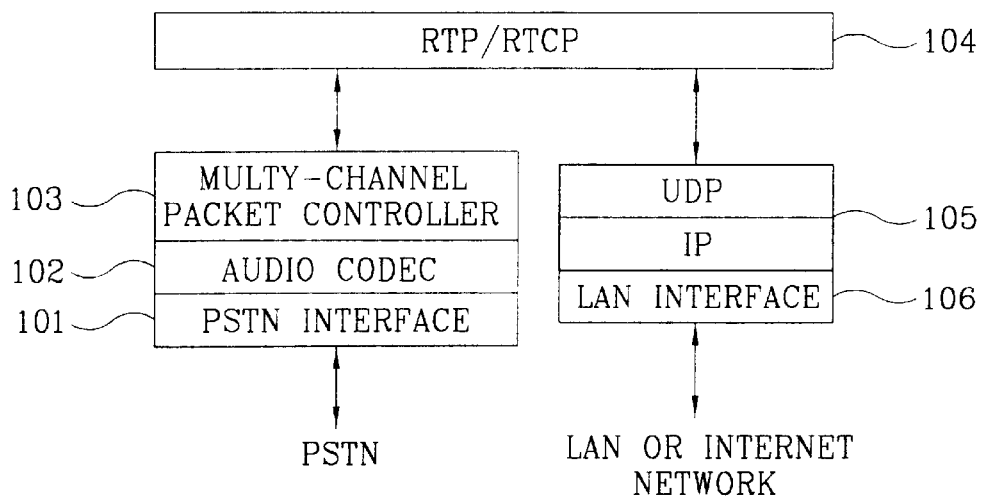
FIG. 1 shows a structure of a standardized voice processing protocol of a general gateway system in accordance with a conventional art.
Figure 2:
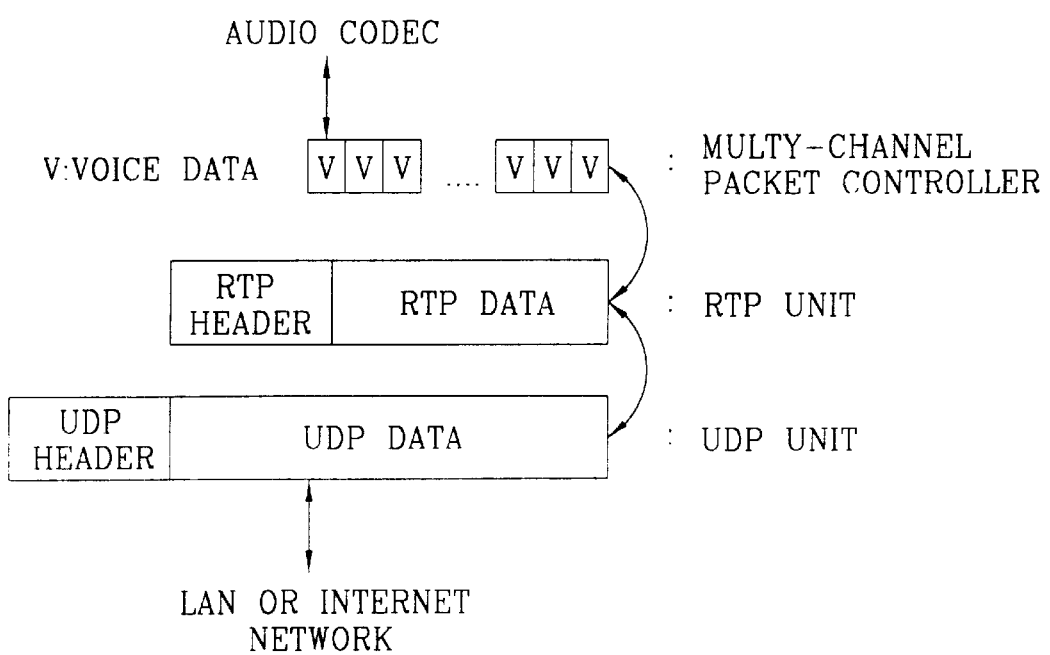
FIG. 2 shows a voice data format processed at each unit of FIG. 1.

The multi-channel packet controller 103 and the UDP unit 105 of FIG. 3 are the same as those of FIG. 1. A timer 201 generates an interrupt signal at every 30 ms of the pecketizing period, and an interrupt service unit 202 posts an interrupt event flag when an interrupt signal is generated. An applied program task unit 203 is polled by the interrupt event flag so as to control receiving and transmitting of the voice data between the multi-channel packet controller 103 and the UDP unit 105.

Figure 4A:
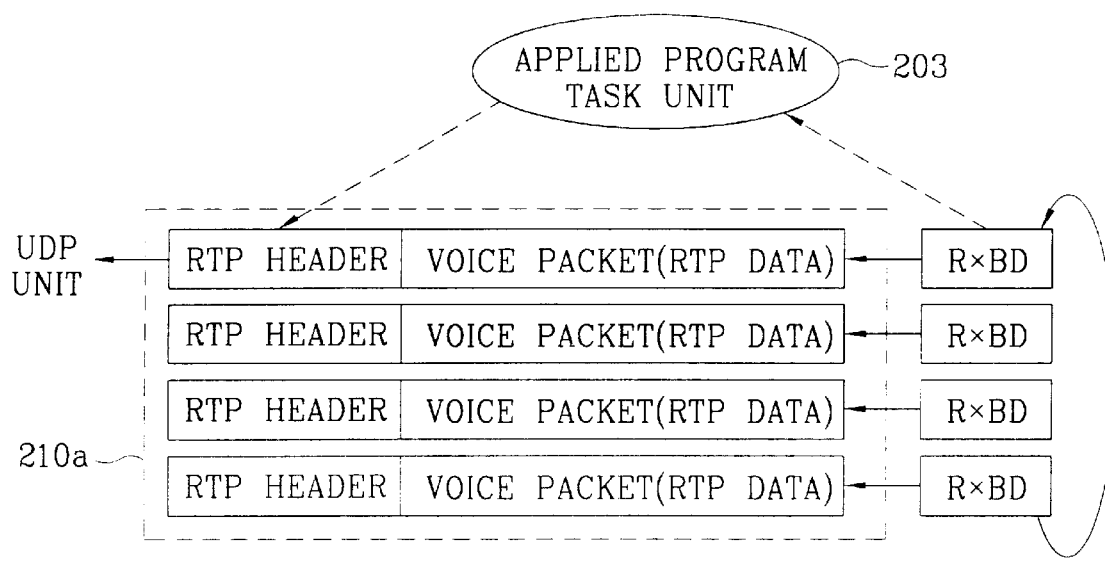
FIG. 4A shows a structure of receiving channel buffer allocation in accordance with the present invention.

FIG. 4A shows a structure of a first receiving channel buffer allocation in accordance with the present invention. As shown in this drawing, the receiving channel buffer 210a is connected to the UDP unit 105. Each memory region of the receiving channel buffer 210a is allocated corresponding to each of the plurality of voice packets by the applied program task unit 203, and voice packets received from the RTP header and the multi-channel packet controller 103 is stored at each of the plurality of memory regions. Each memory region has a receiving buffer descriptor RxBD having an address information indicating a position of the memory region where the voice packet is stored. There is shown 4 buffers in FIG. 4A, but preferably, it is adequate to use 50 buffers.

Figure 4B:
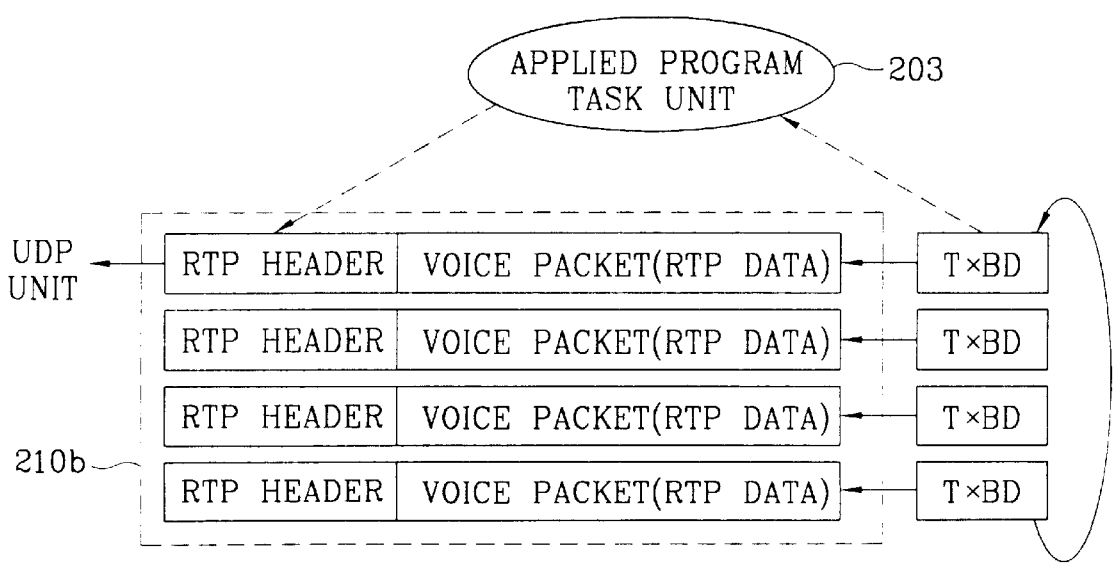
FIG. 4B shows a structure of transmitting channel buffer allocation in accordance with the present invention.

FIG. 4B shows a structure of a first transmission channel buffer allocation in accordance with the present invention. As shown in this drawing, a transmission channel buffer 210b is connected to the UDP unit 105. Each memory region of the transmission channel buffer 210b is allocated corresponding to each of the plurality of voice packets by the applied program task unit 203, and the UDP data received from the UDP unit 105, that is, the RTP header and the voice packets, is stored at each of the plurality of memory regions. Each memory region has a transmission buffer descriptor TxBD having an address information indicating a position of the memory region where the voice packet is stored.

The operation of the present invention constructed as described above will now be explained.

After a system is initialized, the applied program task unit 203 allocates a plurality of buffer regions to the receiving channel buffer 210a and the transmission channel buffer 210b in each channel, and statically stores a RTP header corresponding to each channel at the plurality of buffers as allocated. The voice packet (RTP data) received from the multi-channel packet controller 103 is copied on the allocated memory region of the receiving channel buffer 210a, and a state bit of the receiving buffer descriptor RxBD corresponding to the memory region is renewed by '1'.

A UDT data (RTP header+voice packet (RTP data)) received from the UDT unit 105 is copied on the allocated memory region of the transmission channel buffer 210b, and a state bit of the transmission buffer descriptor TxBD corresponding to the memory region is renewed by '1'. In this respect, the state bit value '1' signifies that there exists a data in a corresponding memory region, while a state bit value '0' signifies that there is no data in the corresponding memory region.

Figure 5:
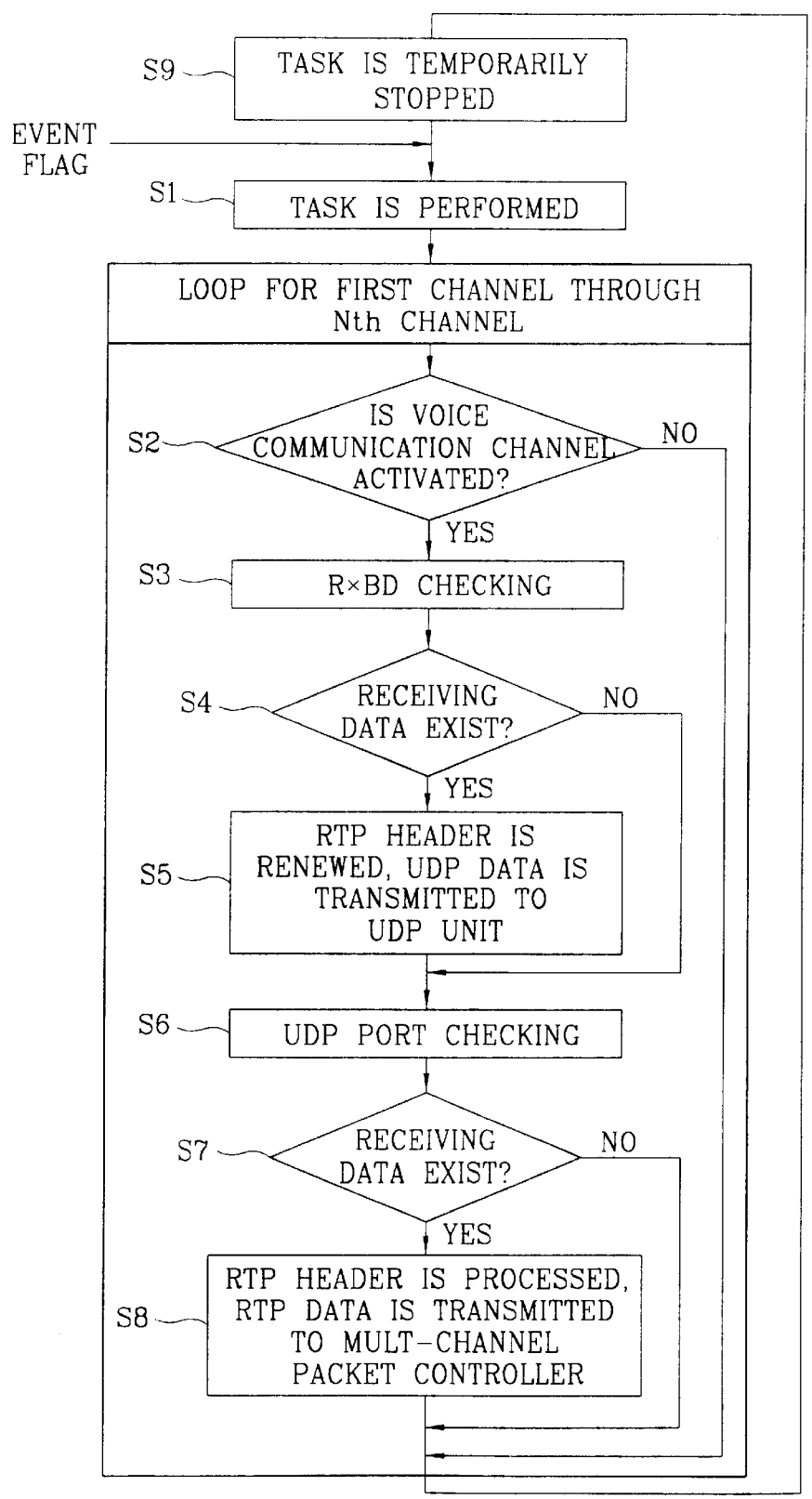
FIG. 5 is a flow chart of an applied program task operation in accordance with the present invention.

A timer 201 generates an interrupt signal at every 30 ms of the pecketizing period, and as the interrupt signal is generated, the interrupt service unit 202 posts an event flag to the applied program task unit 203. Thereafter, the applied program task unit 203 executes an applied program task as shown in FIG. 5 with a flow chart of an operation of an applied program task in accordance with the present invention.

When the event flag is posted from the interrupt service unit 202, the applied program task unit 203 executes the task in the step S1 and sequentially performs the operations of the step 52 through the step S8 for each N number of voice communication channels, details of which will now be described.

In the step S2, the applied program task unit 203 checks whether the voice communication channel is activated. If the channel is activated, it checks the state bit of the receiving buffer descriptor RxBD corresponding to the activated channel so as to check whether a voice packet is stored at the memory region of the receiving channel buffer 210a connected to the descriptor RxBd.

If the state bit value is '1', the applied program task unit 203 judges that there exists a voice packet in the memory region and transmits the stored voice packet (RTP data) and the RTP header, that is the UDP data, to the UDP unit 105. Thereafter, it renews the RTP header of the corresponding memory region, and also renews the state bit of the receiving buffer descriptor RxBD corresponding to the memory region by '0' in the steps S2–S5.

The applied program task unit 203 checks the UDP port to check whether a voice communication channel was activated. If the channel was activated, it signifies that the state bit of the transmission buffer descriptor TxBD was activated by '1'. Accordingly, the applied program task unit 203 judges that there exists a UDP data (RTP header+RTP data) in the corresponding memory region, processes the RTP header of the UDP data, and transmits the RTP data to the multi-channel packet controller 103 in the steps S6–S8. The multi-channel packet controller 103 transmits the voice data corresponding to the received RTP data to the audio CODEC.

After the steps of S2–S8 are performed for the first voice communication channel, the applied program task unit 203 performs the steps of S2–S8 for the second voice communication channel through Nth voice communication channel, and temporarily stops the task at the step of S9, waiting for the next event flag to be posted.

Likewise, after a single interrupt signal is generated, the operations according to FIG. 5 is completed, and when 30 ms lapses after the interrupt signal is generated, the timer 201 generates an interrupt signal again, and then the interrupt service unit 202 posts an event flag, and accordingly, the operations of FIG. 5 is repeatedly performed.

That is, the state of each channel is checked and the data of the activated channel is transmitted by interrupt service switching operation and the task switching operation by once as a whole within the packetizing period, resulting in that the operation time is much reduced and an overhead does not occur.

In the above description for the embodiment of the present invention, for the convenience of explanation, the steps of S2–S5 for transferring the voice packet received from the PSTN network and the steps of S6–S8 for transferring the voice packet received from the IP were described together; nonetheless, the operations of the present invention is not limited thereto. That is, depending on an environment of the system, the operations corresponding to the steps S2–S5 for transferring the voice packet received from the PSTN network may be performed according to the embodiment of the present invention, while the operations corresponding to the steps of S6–S8 for transferring the voice packet received from the IP network may be performed according to any conventional art.

As so far described, according to the present invention, the load applied to the system is minimized by the applied program task transferring the voice packet received from the PSTN network and the voice packet received from the IP network, so that the processing speed is remarkably reduced, and thus more channels can be accommodated.

In addition, besides the PSTN network, the present invention can be also applied to a gateway system between the packet network such as the IP network and the voice network for transmitting and receiving the voice by a TDM (Time Division Multiplex) such as ISDN (Integrated Services Digital Network) or Frame Relay, for obtaining same effectiveness.

It will be apparent to those skilled in the art that various modifications and variations can be made in the present invention without departing from the spirit or scope of the invention. Thus, it is intended that the present invention cover such modifications and variations provided they come within the scope of the appended claims and their equivalents.

What is claimed is:

1. A method for controlling multi-channel voice data of a gateway system comprising:
    allocating statically a plurality of memory regions of a channel buffer;
    storing a real time protocol (RTP) header in each allocated memory region;
    copying in a predetermined order a plurality of voice packets received from a multi-channel packet controller on the allocated memory region to produce a plurality of user datagram protocol (UDP) data for a channel in the channel buffer; and
    transmitting in a predetermined order each of the plurality of UDP data for a first channel from the channel buffer to a UDP unit when an interrupt signal is generated, wherein each allocated memory region has a receiving buffer descriptor having address information indicating a position within the memory region of the channel buffer where a specific voice packet is stored, and wherein the copying includes renewing a state bit of the receiving buffer descriptor, and wherein the transmitting includes checking the state bit of the receiving buffer descriptor of which the state bit informs that the voice packet was stored.

2. A method of controlling multi-channel voice data of a gateway system comprising:
    allocating statically a plurality of first memory regions of a receiving channel buffer, wherein the number of first memory regions is about the same as the number of channels and a plurality of second memory regions of transmitting channel buffer, wherein the number of second memory regions is about the same as the number of channels;
    storing an RTP header at each of the first and the second memory regions as allocated;
    copying in a predetermined order a plurality of voice packets received from a multi-channel packet controller on the allocated plurality of first memory regions to produce a plurality of UDP data for each channel;
    copying in a predetermined order the plurality of UDP data for each channel received from a UDP unit on the plurality of second memory regions; and
    receiving an interrupt signal, then transmitting in a predetermined order the plurality of UDP data stored at the plurality of first memory regions to the UDP unit and transmitting in a predetermined order RTP data of UDP data stored at the second memory regions to the multi-channel packet controller,
    wherein each of the plurality of first memory regions has a receiving buffer descriptor having address information indicating a position of the memory region where a voice packet is stored, and wherein each of the second memory regions has a transmitting buffer descriptor having address information indicating a position of the memory region where a voice packet is stored, and
    wherein the copying includes renewing a state bit of the receiving buffer descriptor or a state bit of the transmitting buffer descriptor, and the transmitting includes checking the state bit of the receiving buffer descriptor or the state bit of the transmitting buffer descriptor of which the state bit is to inform that the voice packet was stored.

3. An apparatus for controlling multi-channel voice data of a gateway system, comprising:
    a multi-channel packet controller means for receiving and transmitting a voice network and an audio signal;
    a UDP means for receiving and transmitting digital voice data from and to a packet network;
    a channel buffer having a plurality of memory regions; and
    an applied program task means for storing a RTP header at individual memory regions within the plurality of memory regions, copying a plurality of voice packets received from the multi-channel packet controller means on the header included in the plurality of memory regions in the channel buffer to produce a plurality of UDP data, and transmitting in a predetermined order the plurality of UDP data to a UDP unit when an interrupt signal is generated,
    wherein each memory region has a receiving buffer descriptor having address information indicating a position of the memory region in the channel buffer where the voice packet is stored, and
    wherein the applied program task means renews a state bit of the receiving buffer descriptor in copying and checks the state bit of the receiving descriptor in transmitting, wherein the state bit indicates that the voice packet was stored.

4. An apparatus for controlling multi-channel voice data of a gateway system, comprising:
    a multi-channel packet controller means for receiving and transmitting a voice network and an audio signal;
    a UDP means for receiving and transmitting voice data from and to a packet network;

a receiving channel buffer having a plurality of first memory regions;

a transmitting channel buffer having a plurality of second memory regions; and an applied program task means for storing headers at individual memory regions of the plurality of first and second memory regions, copying in a predetermined order a plurality of voice packets received from the multi-channel packet controller means on the header included plurality of first memory regions in the receiving channel buffer to produce a plurality of UDP data, copying in a predetermined order the plurality of UDP data received from the UDP means on the plurality of second memory regions in the transmitting channel buffer, and transmitting the plurality of UDP data stored at the plurality of first memory regions to the UDP means and transmitting RTP data of the UDP data stored at each of the plurality of second memory regions in the transmitting channel buffer to the multi-channel packet controller means, wherein each of the plurality of first memory regions in the receiving channel buffer has a receiving buffer descriptor having address information indicating a position of the first memory region where the voice packet is stored, and wherein each of the second plurality of memory regions has a transmitting buffer descriptor having address information indicating a position of the second memory region where the voice packet is stored, and wherein the applied program task means renews a state bit of the receiving buffer descriptor or a state bit of the transmitting buffer descriptor in copying and checks the state bit of the receiving descriptor or the state bit of the transmitting descriptor in transmitting, wherein the state bit indicates that the voice packet was stored.

5. The method according to claim 1, further comprising:

allocating statically a plurality of memory regions of a second channel buffer;

storing an RTP header in each of the allocated memory regions;

copying a plurality of voice packets from a second channel onto the allocated memory regions; and transmitting in a predetermined order each of the plurality of UDP data for a second channel from the second channel buffer to the UDP unit after the transmission of the first channel is completed.

6. The method according to claim 1, wherein each of the plurality of voice packets are individually stored in predetermined individual memory regions of the channel buffer until the interrupt signal is generated.

7. The method according to claim 1, wherein the UDP data is stored in the channel buffer until the interrupt signal is generated, and wherein the UDP data is transmitted after the interrupt signal is received within the gateway system.

8. The method according to claim 2, wherein each of the plurality of voice packets are individually stored in predetermined memory regions of the first memory regions in the receiving channel buffer until the interrupt signal is received.

9. The method according to claim 2, wherein the plurality of UDP data received from the UDP unit are stored in individual memory regions of the second memory regions of the transmitting channel buffer until the interrupt signal is received.

10. The apparatus according to claim 3, wherein each of the plurality of voice packets are individually stored in predetermined individual memory regions of the channel buffer until the interrupt signal is generated.

11. The apparatus according to claim 3, wherein the UDP data is stored in the channel buffer until the interrupt signal is generated, and wherein the UDP data is transmitted after the interrupt signal is received within the gateway system.

12. The apparatus according to claim 4, wherein each of the plurality of voice packets are individually stored in predetermined memory regions of the first memory regions in the receiving channel buffer until the interrupt signal is received.

13. The apparatus according to claim 4, wherein the plurality of UDP data received from the UDP unit are stored in individual memory regions of the second memory regions of the transmitting channel buffer until the interrupt signal is received.

14. A method of transferring data, comprising:

receiving data from a source;

packetizing the data into packets;

creating a channel buffer;

labeling predetermined portions of the channel buffer with label headers;

storing and describing the packets in the labeled predetermined portions of the channel buffer to produce a plurality of described data;

periodically generating an interrupt signal; and transmitting in a predetermined order the produced plurality of described data when the interrupt signal is generated, wherein the periodic generation of an interrupt signal occurs every 30 ms, and wherein an interrupt service unit posts an event flag when the interrupt signal is generated, where the event flag causes an applied task unit to determine whether a voice communication channel is activated and if so, checks a state bit of a receiver buffer descriptor to check whether a packet is stored in the predetermined portions of the channel buffer.

15. The method according to claim 14, wherein the receiving data from a source comprises:

receiving an analog signal from the source; and converting the analog signal to a digital signal;

wherein the labeling of the predetermined portions of the channel buffer comprises:

assigning real time protocol (RTP) headers to individual memory regions within the channel buffer;

wherein storing and describing the packets comprises:

storing packets into predetermined individual memory regions with corresponding RTP headers; and creating individual buffer descriptors for each; individual memory region, wherein the individual buffer descriptors include address information indicating a position of the memory region where a packet is stored corresponding to the individual memory regions in the channel buffer.

16. The method according to claim 15, further comprising:

storing in a predetermined order the plurality of described data in a plurality of second memory regions of a second channel buffer;

creating second individual buffer descriptors for the plurality of second memory regions, wherein the second individual buffer descriptors include address information indicating a position of the memory region where a packet is stored; and transmitting in a predetermined order the plurality of described data from the plurality of second memory regions to a multi-channel packet controller when the interrupt signal is generated.

17. The method according to claim 14, further comprising:
   confirming a packet presence in the predetermined portions of the channel buffer;
   transmitting the packet and the label headers to a UDP unit;
   renewing the label headers after transmission;
   confirming that a channel is activated;
   signaling a state bit;
   processing the packet and label headers;
   transmitting the packets and the label headers to a multi-channel packet controller; and
   transmitting voice data from the multi-channel packet controller.

* * * * *